US012614775B2

(12) United States Patent
Sauerteig et al.

(10) Patent No.:  US 12,614,775 B2
(45) Date of Patent:  Apr. 28, 2026

(54) BATTERY PACK, TREATMENT SYSTEM AND METHOD FOR THE PRODUCTION OF A BATTERY PACK

(71) Applicants:Andreas Stihl AG & Co. KG, Waiblingen (DE); Murata Manufacturing Co., Ltd., Nagaokakyo (JP)

(72) Inventors: Daniel Sauerteig, Kernen im Remstal (DE); Julien Scholl, Waiblingen (DE); Kenichi Ozawa, Koriyama (JP); Takayuki Sato, Koriyama (JP); Daiki Misawa, Koriyama (JP); Marcel Wilka, Boebingen (DE); Martin Schurr, Mutlangen (DE); Uwe Bossmann, Esslingen a. N. (DE); Dirk Liepold, Fellbach (DE); Daniel Wagner, Winterbach (DE)

(73) Assignees: Andreas Stihl AG & Co. KG, Waiblingen (DE); Murata Manufacturing Co., Ltd., Nagaokakyo (JP)

( * ) Notice: Subject to any disclaimer, the term of this patent is extended or adjusted under 35 U.S.C. 154(b) by 0 days.

(21) Appl. No.: 16/869,911

(22) Filed: May 8, 2020

(65) Prior Publication Data

US 2020/0358060 A1     Nov. 12, 2020

(30) Foreign Application Priority Data

May 10, 2019     (EP) ..................................... 19173800

(51) Int. Cl.
H01M 10/647          (2014.01)
H01M 10/6235        (2014.01)
(Continued)

(52) U.S. Cl.
CPC ..... H01M 10/6235 (2015.04); H01M 10/647 (2015.04); H01M 50/169 (2021.01);
(Continued)

(58) Field of Classification Search
CPC .... H01M 50/20; H01M 50/502; H01M 50/54; H01M 50/169; H01M 50/516;
(Continued)

(56) References Cited

U.S. PATENT DOCUMENTS 10,483,519 B2    11/2019  Iwasaki et al.
2007/0281208 A1  12/2007  Yoon et al.
(Continued)

FOREIGN PATENT DOCUMENTS

CN       203746993 U     7/2014
CN       106558672 A     4/2017
(Continued)

OTHER PUBLICATIONS

EPO machine generated English translation of KR-2016-0015751-A (Year: 2016).*
(Continued)

*Primary Examiner* — Kimberly Wyluda
(74) *Attorney, Agent, or Firm* — Crowell & Moring LLP

(57)          ABSTRACT

A battery pack supplies an electrically driven treatment apparatus with an electric driving power. The battery pack includes: a stack housing, wherein the stack housing has a common housing opening defined by a housing edge, and a plurality of pouch cells, wherein the pouch cells have cell tabs and are configured and disposed in a stack within the stack housing such that the cell tabs at least with tab parts on the common housing opening project beyond at least one edge portion of the housing edge. The tab parts are directly electrically connected to each other by welded connections.

5 Claims, 13 Drawing Sheets

(51) Int. Cl.

| | |
|---|---|
| *H01M 50/169* | (2021.01) |
| *H01M 50/172* | (2021.01) |
| *H01M 50/211* | (2021.01) |
| *H01M 50/247* | (2021.01) |
| *H01M 50/284* | (2021.01) |
| *H01M 50/289* | (2021.01) |
| *H01M 50/516* | (2021.01) |
| *H01M 50/54* | (2021.01) |
| *H01M 50/55* | (2021.01) |
| *H01M 50/557* | (2021.01) |
| *H01M 50/566* | (2021.01) |

(52) U.S. Cl.
CPC ....... *H01M 50/211* (2021.01); *H01M 50/247* (2021.01); *H01M 50/284* (2021.01); *H01M 50/289* (2021.01); *H01M 50/516* (2021.01); *H01M 50/54* (2021.01); *H01M 50/55* (2021.01); *H01M 50/557* (2021.01); *H01M 50/172* (2021.01); *H01M 50/566* (2021.01)

(58) Field of Classification Search
CPC ............. H01M 50/211; H01M 50/172; H01M 50/284; H01M 50/566; H01M 10/6235; H01M 10/647
See application file for complete search history.

(56) References Cited

U.S. PATENT DOCUMENTS

| | | | |
|---|---|---|---|
| 2008/0233475 A1 | 9/2008 | Kozu et al. | |
| 2010/0247997 A1 | 9/2010 | Hostler et al. | |
| 2012/0301747 A1 | 11/2012 | Han et al. | |
| 2013/0230759 A1* | 9/2013 | Jeong ................... | H01M 50/211 429/99 |
| 2014/0015535 A1 | 1/2014 | Lopez | |
| 2015/0044543 A1* | 2/2015 | Yoon ................... | H01M 50/578 429/158 |
| 2015/0380697 A1 | 12/2015 | Osborne et al. | |
| 2016/0308256 A1 | 10/2016 | Huang et al. | |
| 2016/0322673 A1 | 11/2016 | Meintschel et al. | |
| 2017/0229681 A1* | 8/2017 | Gaugler .............. | H01M 50/258 |
| 2018/0229621 A1 | 8/2018 | Roh et al. | |
| 2018/0277803 A1 | 9/2018 | Park et al. | |
| 2019/0103624 A1 | 4/2019 | Lim et al. | |
| 2019/0198848 A1* | 6/2019 | Onodera ............. | H01M 50/105 |
| 2020/0136121 A1 | 4/2020 | Allen et al. | |
| 2021/0242525 A1* | 8/2021 | Lee ..................... | H01M 50/209 |

FOREIGN PATENT DOCUMENTS

| | | | | |
|---|---|---|---|---|
| CN | 206076354 U | | 4/2017 | |
| CN | 107195830 A | * | 9/2017 | ............ H01M 10/04 |
| CN | 107910485 A | * | 4/2018 | .......... H01M 10/486 |
| CN | 108365364 A | | 8/2018 | |
| CN | 109428024 A | | 3/2019 | |
| CN | 109616606 A | | 4/2019 | |
| EP | 3 367 468 A1 | | 8/2018 | |
| JP | 2016-35876 A | | 3/2016 | |
| JP | 2016-539474 A | | 12/2016 | |
| JP | 2018-533815 A | | 11/2018 | |
| JP | 2019-502229 A | | 1/2019 | |
| KR | 20160015751 A | * | 2/2016 | .......... H01M 50/531 |
| KR | 2017-0135476 A | * | 12/2017 | |
| WO | WO-2013187687 A1 | * | 12/2013 | ............ H01M 10/48 |
| WO | WO-2014189272 A1 | * | 11/2014 | ............ H01M 50/10 |
| WO | WO 2018/195218 A1 | | 10/2018 | |

OTHER PUBLICATIONS

EPO machine generated English translation of WO-2014-189272-A1 (Year: 2014).*

EPO machine generated English translation of CN-107910485-A (Year: 2018).*

EPO machine generated English translation of CN-107195830-A (Year: 2017).*

EPO machine generated English translation of KR 2017-0135476 A (Year: 2017).*

Chinese-language Office Action issued in Chinese Application No. 202010382435.2 dated Oct. 31, 2023 with English translation (16 pages).

Japanese-language Office Action issued in Japanese Application No. 2020-081681 dated May 21, 2024 with English translation (15 pages).

Japanese-language Office Action issued in Japanese Application No. 2020-081681 dated Nov. 5, 2024 with English translation (10 pages).

Chinese-language Office Action issued in Chinese Application No. 202010382435.2 dated Oct. 12, 2024 with English translation (18 pages).

* cited by examiner a)

a), b)

b)

BATTERY PACK, TREATMENT SYSTEM AND METHOD FOR THE PRODUCTION OF A BATTERY PACK

FIELD OF APPLICATION AND PRIOR ART

The invention relates to a battery pack for supplying an electrically driven treatment apparatus with electric driving power, to a treatment system including such a battery pack and to an electrically driven treatment apparatus, and to a method for the production of a battery pack for supplying an electrically driven treatment apparatus with electric driving power.

Problem and Solution

The invention is based on the problem of providing a battery pack for supplying an electrically driven treatment apparatus with electric driving power, a treatment system including such a battery pack and an electrically driven treatment apparatus, and a method for the production of a battery pack for supplying an electrically driven treatment apparatus with electric driving power, wherein the battery pack and the method each have improved properties.

The invention solves the problem by providing a battery pack, by providing a treatment system, and by providing a method, according to the claimed invention. Advantageous developments and/or configurations of the invention are described and claimed herein.

The battery pack according to the invention is designed or configured for supplying, in particular automatic supplying, of an electrically driven treatment apparatus, in particular a gardening, forestry and/or building construction apparatus, with electric driving power. The battery pack comprises a stack housing and a plurality of pouch cells. The stack housing has a common housing opening defined or delimited by a housing edge, in particular of the stack housing. The pouch cells have cell tabs and are designed or configured and disposed in a stack within the stack housing such that the cell tabs, in particular all of the cell tabs, at least with tab parts, in particular in each case, on the common housing opening project beyond at least one edge portion of the housing edge, in particular outwards through the housing opening. In particular all of the tab parts are directly electrically connected to each other by welded connections.

The projecting of the tab parts allows that the tab parts, in time after arrangement of the pouch cells in the stack within the stack housing, can still be relatively easily accessible from the outside, and thus can be or will be electrically connected to each other by the welded connections in a relatively simple manner, and thus allow production of the battery pack in a relatively simple manner.

In particular, the stack housing can be massive and/or cuboid in shape. In addition or as an alternative, the stack housing can partially or even completely be composed of aluminum.

The pouch cells can be configured for supplying the treatment apparatus with the driving power. In addition or as an alternative, the pouch cells can be accumulator cells or battery cells, or can be in each case individual rechargeable storage elements for electric energy working on an electrochemical basis. In particular, the pouch cells can be lithium-ion accumulator cells. Further in addition or as an alternative, the pouch cells can be connected in parallel or in series. Further in addition or as an alternative, the tab parts, in particular in each case, of next pouch cells can be electrically connected to each other directly by one of the welded connections. Further in addition or as an alternative, the tab parts can be mechanically connected to each other directly by the welded connections. Further in addition or as an alternative, the pouch cells can be flat cells. Further in addition or as an alternative, a surface of the pouch cells can be rectangular. Further in addition or as an alternative, the pouch cells can be similar or identical, in particular of the same type and/or the same construction.

The cell tabs can be referred to as contact tabs, cell contacts, terminals, poles or connector electrodes.

The term directly can mean without an intermediate element.

The welded connections can be laser welded connections or ultrasonic welded connections.

The pouch cells can be disposed in the stack one on top of the other or superimposed, in particular mutually in parallel in a respective main plane. In addition or as an alternative, the stack can be cuboid in shape. Further in addition or as an alternative, the pouch cells with outer shells or cell shells can be disposed, in particular completely and/or only, in the stack within the stack housing. Further in addition or as an alternative, the tab parts can be disposed, in particular completely and/or only, outside the stack housing. Further in addition or as an alternative, there does not need to be a housing wall disposed between the tab parts and the outer or cell shells. Further in addition or as an alternative, the cell tabs with the tab parts, in particular in each case, can project beyond an edge portion, in particular in each case, a next or adjacent edge portion. In particular, the cell tabs with the tab parts can project beyond the housing edge, in particular the complete housing edge. Further in addition or as an alternative, the cell tabs with the tab parts, in particular in each case, can project beyond the at least one edge portion at a minimum of 2 millimeters (mm), in particular a minimum of 5 mm, in particular a minimum of 10 mm.

In a development of the invention, the common housing opening is the only housing opening for the cell tabs, in particular the tab parts, in particular for projecting beyond.

In addition or as an alternative, the pouch cells are designed or configured and disposed in the stack such that the cell tabs, in particular all of the cell tabs, in particular the tab parts, are disposed on a common tab side of the stack, in particular only, in particular a single, common tab side of the stack.

This allows a relatively simple structural design of the battery pack and a relatively simple production of the battery pack.

In particular, the pouch cells, in particular in each case, can have the cell tabs on a same border or a same edge, in particular of an outer or cell shell of the pouch cell. In addition or as an alternative, the tab side can be a side of the cuboid of the stack, where cuboid in shape. Further in addition or as an alternative, the stack with the common tab side can be disposed on the common housing opening.

In a development of the invention, the housing edge defines an opening plane of the housing opening, in particular the common housing opening. The tab parts, in particular all of the tab parts, extend, in particular only, in parallel to the opening plane. This allows that the welded connections can be or will be produced in a relatively simple manner. In particular, the opening plane can be or can extend in parallel to the tab side, where present, or the tab parts can extend in parallel to the tab side. In addition or as an alternative, the tab parts can be bent parts of the cell tabs and, in particular in each case, project beyond a next or adjacent edge portion, in particular in each case, in prolongation of a bending axis of the cell tabs. Further in addition or as an alternative, there does not need to be a housing wall disposed between the tab parts extending in parallel and the outer or cell shells.

In a development of the invention, the battery pack comprises at least one electric power connector. The electric power connector is electrically connected, in particular directly, and in particular mechanically, to one of the tab parts by a welded connection. The projection of the tab part allows that the tab part, in time after arrangement of the pouch cells in the stack within the stack housing, can be or will be connected to the power connector by the welded connection in a relatively simple manner. Particularly, this can allow that, in time after arrangement of the pouch cells in the stack within the stack housing, the tab parts to each other and the tab part to the power connector can be or will be connected in a, in particular only, in particular a single and/or a common production step by the, in particular respective, welded connection. In particular, the electric power connector can at least partially be disposed between the tab part extending in parallel and the edge portion, in particular parallel to the tab part.

In a development of the invention, the stack housing is cuboid shaped and has at least four, in particular five, housing walls. Wall edges of four of the housing walls define or delimit the housing opening, in particular common housing opening, in particular on the peripheral side.

In a development of the invention, the stack housing has a first housing wall, in particular the first housing wall, and a second housing wall, in particular the second housing wall. The second housing wall is disposed opposite to the first housing wall with a distance, in particular a fixed distance. The stack is disposed between the first housing wall and the second housing wall. A height of the stack in a stack direction is limited by the first housing wall and the second housing wall, in particular by their distance. In particular, fixed distance can mean that the distance between the first housing wall and the second housing wall can vary only to a minor extent or not at all, as compared to the cell thicknesses of the pouch cells in the stack direction, in particular upon inflating of the pouch cells. In addition or as an alternative, the second housing wall, in particular with a main plane, can be disposed parallel to the first housing wall, in particular a main plane of the first housing wall. Further in addition or as an alternative, the pouch cells can be disposed in the stack with a respective main plane orthogonal to the stack direction and/or in parallel to the first housing wall, in particular a main plane of the first housing wall, and/or in parallel to the second housing wall, in particular a main plane of the second housing wall. Further in addition or as an alternative, the stack can be disposed with the stack direction orthogonal to the first housing wall, in particular a main plane of the first housing wall, and/or the second housing wall, in particular a main plane of the second housing wall. Further in addition or as an alternative, the distance can be in the stack direction. Further in addition or as an alternative, the height can correspond to the distance, in particular be equal thereto.

In a development of the invention, the stack housing has a first housing part and a second housing part. The first housing part has the first housing wall. The second housing part has the second housing wall. Furthermore, the first housing part and the second housing part are mechanically connected to each other, in particular directly, by at least one welded connection. The projection of the tab parts allows that, in time after arrangement of the pouch cells in the stack within the stack housing, the tab parts to each other, the tab part to the power connector, where present, and/or the first housing part and the second housing part to each other can be or will be connected in a, in particular only, in particular a single, and/or a common production step by the, in particular respective, welded connection.

In a development of the invention, the battery pack comprises at least one compensation element. The at least one compensation element is disposed in the stack. Furthermore, the at least one compensation element extends across a major part of a surface of the pouch cells and is designed or configured to adjust, in particular adapt, the height of the stack to the distance, in particular fixed distance, between the first housing wall and the second housing wall, across a compensation thickness of the at least one compensation element. In particular, the at least one compensation element can comprise, in particular be, a foamed material, in particular sponge rubber. In addition or as an alternative, the at least one compensation element can be configured to buffer inflating, where present, of the pouch cells in the stack direction. Further in addition or as an alternative, the at least one compensation element can be a thermal insulation, wherein the at least one thermal insulation can be disposed in each case between two of the pouch cells. Further in addition or as an alternative, a major part of the surface can mean at least 70 percent (%), in particular at least 80%, in particular at least 90%, of the surface. In particular, the at least one compensation element can extend across the entire surface of the pouch cells.

In a development of the invention, the pouch cells are designed or configured and disposed in the stack such that the cell tabs, in particular all of the cell tabs, are disposed, in particular only, in particular exactly, in two tab columns. Averted or remote end limits of the tab columns define or delimit an intermediate zone, in particular only one intermediate zone, in particular a single intermediate zone. The battery pack comprises a circuit board. The circuit board is disposed, in particular completely and/or only, within the intermediate zone and electrically connected, and in particular mechanically connected, to a number of the cell tabs, in particular tab parts, in particular in each case, by a welded connection. This allows that the cell tabs, in particular tab parts, in time after arrangement of the circuit board, can still be relatively easily accessible from the outside, and thus can be or will be electrically connected to each other by the welded connections in a relatively simple manner. In particular, this allows that, in time after arrangement of the pouch cells in the stack within the stack housing, the tab parts to each other, the tab part to the power connector, where present, the first housing part and the second housing part to each other, where present, and/or the circuit board to the number of cell tabs, in particular tab parts, can be or will be connected in a, in particular only, in particular a single, and/or a common production step by the, in particular respective, welded connection. In particular, the cell tabs of the pouch cells, in particular a respective one of the pouch cells, and thus the tab columns can be spaced from each other. In other words: the pouch cells can each have two cell tabs spaced from each other and be configured and disposed in the stack such that cell tabs of different pouch cells can be disposed in a first one of the tab columns and other cell tabs of different pouch cells can be disposed in a second one of the tab columns, wherein the first tab column and the second tab column can be spaced from each other. Further in addition or as an alternative, the tab columns can be referred to as tab rows. Further in addition or as an alternative, the tab columns can be or can extend in parallel to each other. Further in addition or as an alternative, the circuit board can be disposed on the stack. In particular, on the stack can mean that the circuit board can be spaced from the stack at a maximum of 20 mm, in particular a maximum of 10 mm in particular a maximum of 5 mm. Further in addition or as an alternative, the circuit board does not need to reach up to the averted end limits. Further in addition or as an alternative, the circuit board can be disposed between the tab columns, in particular between facing or close end limits of the tab columns. Further in addition or as an alternative, the circuit board can at least partially expose or not cover the tab columns, in particular in each case. Further in addition or as an alternative, the circuit board can be electrically connected to the number of cell tabs, in particular tab parts, via electrical cell connectors. Further in addition or as an alternative, the circuit board can hold measuring electronics, wherein the measuring electronics can be configured for measuring, in particular automatic measuring, of voltages, in particular electrical voltages, in particular values of voltages, of pouch cells, in particular all of the pouch cells. Further in addition or as an alternative, the circuit board can be disposed on the housing opening, in particular the common housing opening.

In a development of the invention, the battery pack comprises a frame. The frame supports the circuit board and is disposed on the housing opening, in particular the common housing opening. The cell tabs, in particular all of the cell tabs, and the circuit board are positioned in relation to each other, in particular fixed, by means of the stack housing and the frame. The stack housing and the frame allow relatively simple positioning. In particular, the cell tabs, in particular the tab parts, can be disposed on the housing opening. In addition or as an alternative, the frame can partially or completely be made of synthetic material.

In a development of the invention, the battery pack has, in particular the pouch cells have, a maximum electric driving power of a minimum of 1 kilowatt (kW), in particular a minimum of 2 kW, and/or of a maximum of 10 kW, in particular a maximum of 5 kW.

In addition or as an alternative, the battery pack has, in particular the pouch cells have, a nominal voltage, in particular an electrical nominal voltage, of a minimum of 10 Volts (V), in particular a minimum of 20 V, and/or of a maximum of 100 V, in particular a maximum of 50 V.

In addition or as an alternative, the battery pack has, in particular the pouch cells have, a maximum energy content, in particular an electrical maximum energy content, of a minimum of 100 Watt hours (Wh), in particular a minimum of 200 Wh, and/or of a maximum of 1000 Wh, in particular a maximum of 500 Wh.

In addition or as an alternative, the battery pack has a mass of a minimum of 0.5 kilograms (kg), in particular a minimum of 1 kg, and/or of a maximum of 10 kg, in particular a maximum of 5 kg.

In addition or as an alternative, the battery pack has a height of a minimum of 2.5 centimeters (cm) and/or of a maximum of 10 cm, and/or a width of a minimum of 5 cm and/or of a maximum of 20 cm, and/or a depth of a minimum of 7.5 cm and/or of a maximum of 30 cm.

The treatment system according to the invention includes a battery pack, in particular the battery pack, as described above and an electrically driven treatment apparatus, in particular the electrically driven treatment apparatus. The battery pack and the treatment apparatus are designed or configured for electrical connection with each other for supplying, in particular automatic supplying, of the treatment apparatus with electric driving power from the battery pack.

In particular, the treatment system can be a treatment system for gardening, forestry and/or building construction. In addition or as an alternative, the treatment apparatus can be a treatment apparatus for gardening, forestry and/or building construction. Further in addition or as an alternative, the treatment apparatus can be a hand-guided, in particular floor-guided or hand-held, treatment apparatus. In particular hand-guided, in particular hand-held, treatment apparatus can mean that the treatment apparatus can have a maximum mass of 50 kilograms (kg), in particular of 20 kg, in particular of 10 kg. Further in addition or as an alternative, the treatment apparatus can include an electric drive motor. Further in addition or as an alternative, the battery pack and the treatment apparatus can be configured for detachable electrical connection with each other, in particular without using a tool and/or without destruction, particularly by using plug connectors. Further in addition or as an alternative, the battery pack and the treatment apparatus can be configured for, in particular detachable, mechanical connection with each other, in particular without using a tool and/or detachable without destruction. In particular, the treatment apparatus can be configured for holding the battery pack.

In a development of the invention, the treatment apparatus has a battery accommodation, in particular a battery compartment. The battery accommodation is designed or configured for accommodating the battery pack.

In a development of the invention, the treatment apparatus is a saw, a pole pruner, a clearing saw, a brush cutter, hedge shears, a hedge cutter, a blower device, a leaf blower, a lopper, a cutoff grinder, a sweeper device, a sweeper roller, a sweeper brush, a lawn mower, a dethatcher or a grass trimmer.

The method according to the invention for the production of a battery pack, in particular the battery pack, in particular as described above, for supplying an electrically driven treatment apparatus, in particular the electrically driven treatment apparatus, with an electric driving power comprises the steps:

a) disposing a plurality of pouch cells, in particular the plurality of pouch cells, in a stack, in particular the stack, within a stack housing, in particular the stack housing, wherein the stack housing has a common housing opening, in particular the common housing opening, defined by a housing edge, in particular the housing edge, wherein the pouch cells have cell tabs, in particular the cell tabs, and are configured such that the cell tabs at least with tab parts, in particular the tab parts, on the common housing opening project beyond at least one edge portion, in particular the edge portion, of the housing edge.

b) in time after arrangement, welding the tab parts for direct electrical connecting the tab parts to each other.

The method can allow the same advantages as the battery pack described above.

In particular, the welding can be laser welding or ultrasonic welding.

In a development of the invention, the housing edge defines an opening plane, in particular the opening plane, of the housing opening, in particular the common housing opening. The tab parts extend in parallel to the opening plane. The step b) comprises: disposing a welding base or fixture, in particular a welding anvil, at least partially between at least one of the tab parts extending in parallel and the edge portion, in particular in parallel to the tab part, and welding the tab part using the welding base or fixture. This feature is allowed by the projecting tab parts. In particular the welding base may be removed, in particular from the battery pack, in time after step b) or welding, respectively.

In a development of the invention, the stack housing has a first housing part, in particular the first housing part, and a second housing part, in particular the second housing part. The first housing part has a first housing wall, in particular the first housing wall, and the second housing part has a second housing wall, in particular the second housing wall. The step a) comprises: disposing the stack on the first housing wall and in time after disposing the second housing wall on the stack such that the second housing wall is disposed opposite and with a distance, in particular the distance, to the first housing wall, that the stack is disposed between the first housing wall and the second housing wall and a height of the stack, in particular the height of the stack, in a stack direction, in particular the stack direction, is limited by the first housing wall and the second housing wall. The step b) comprises: welding the first housing part and the second housing part for mechanical connection, in particular directly, of the first housing part and the second housing part to each other. This is facilitated by projecting of the tab parts. In particular, the welding can be laser welding or ultrasonic welding.

BRIEF DESCRIPTION OF THE DRAWINGS

Further advantages and aspects of the invention can be gathered from the claims and from the following description of preferred exemplary embodiments of the invention, which will be explained hereinbelow with reference to the figures. Therein:

DETAILED DESCRIPTION OF THE EXEMPLARY EMBODIMENTS

FIGS. 1 to 14 show a battery pack 1 for supplying an electrically driven treatment apparatus 101 with an electric driving power AL and a method for the production of the battery pack 1 for supplying the electrically driven treatment apparatus 101 with an electric driving power AL.

Figure 7:
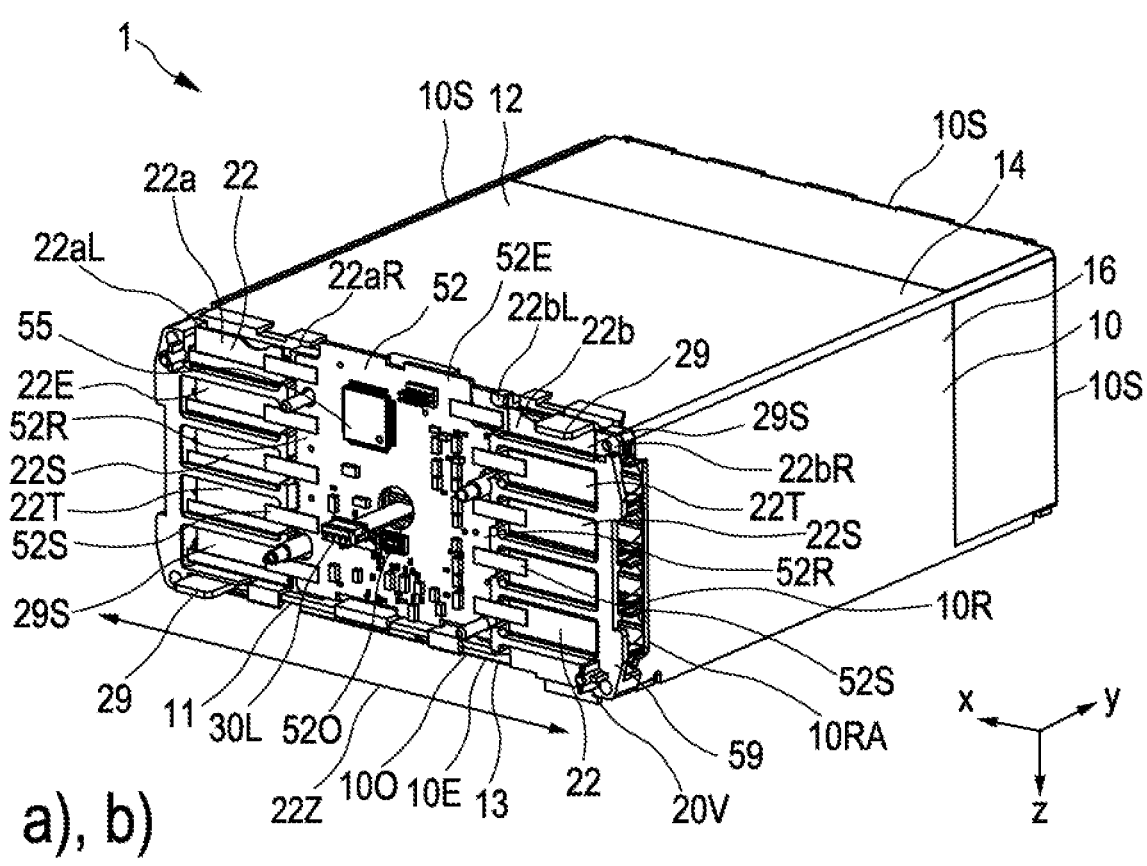
FIG. 7 shows a perspective view of the first housing part, the stack, the second housing part and a circuit board of the battery pack from FIG. 1 and a method according to the invention.

The battery pack 1 comprises a stack housing 10 and a plurality of pouch cells 21. The stack housing 10 has a common housing opening 10O defined by a housing edge 10R, as illustrated in FIG. 7. The pouch cells 21 have cell tabs 22 and are configured and disposed in a stack 20 within the stack housing 10 such that the cell tabs 22 at least with tab parts 22T, in particular in each case, project on the common housing opening 10O beyond at least one edge portion 10RA of the housing edge 10R, in particular through the housing opening 10O outwards. The tab parts 22T are directly electrically connected to each other by welded connections 22S.

The method comprises the steps: a) disposing a plurality of pouch cells 21 in the stack 20 within the stack housing 10, wherein the stack housing 10 has the common housing opening 10O defined by the housing edge 10R, wherein the pouch cells 21 have the cell tabs 22 and are configured such that the cell tabs 22 at least with the tab parts 22T on the common housing opening 10O project beyond the at least one edge portion 10RA of the housing edge 10R. b) in time after the disposing, welding the tab parts 22T for direct electrical connecting of the tab parts 22T to each other.

In the exemplary embodiment shown, the battery pack 1 includes ten pouch cells 21. In alternative exemplary embodiments, the battery pack can include at least two pouch cells.

Furthermore, in the exemplary embodiment shown, the pouch cells 21 in the stack 20 are disposed in a stack direction z. Moreover, in the exemplary embodiment shown, the pouch cells 21 respectively extend in directions x, y orthogonal to the stack direction z.

Further, in the exemplary embodiment shown, the cell tabs 22 with the tab parts 22T project beyond in the direction −y orthogonal to the stack direction.

Further, in the exemplary embodiment shown, the tab parts 22T, in particular in each case, of next pouch cells 21 are electrically connected to each other directly by one of the welded connections 22S.

The step b) comprises: welding the tab parts 22T, in particular in each case, of next pouch cells 21 for direct electrical connecting of the tab parts 22T of next pouch cells 21 to each other.

In particular, the pouch cells 21 are connected in series, in particular in the stack direction z.

In detail, the common housing opening 10O is the only housing opening for the cell tabs 22.

Figure 5:
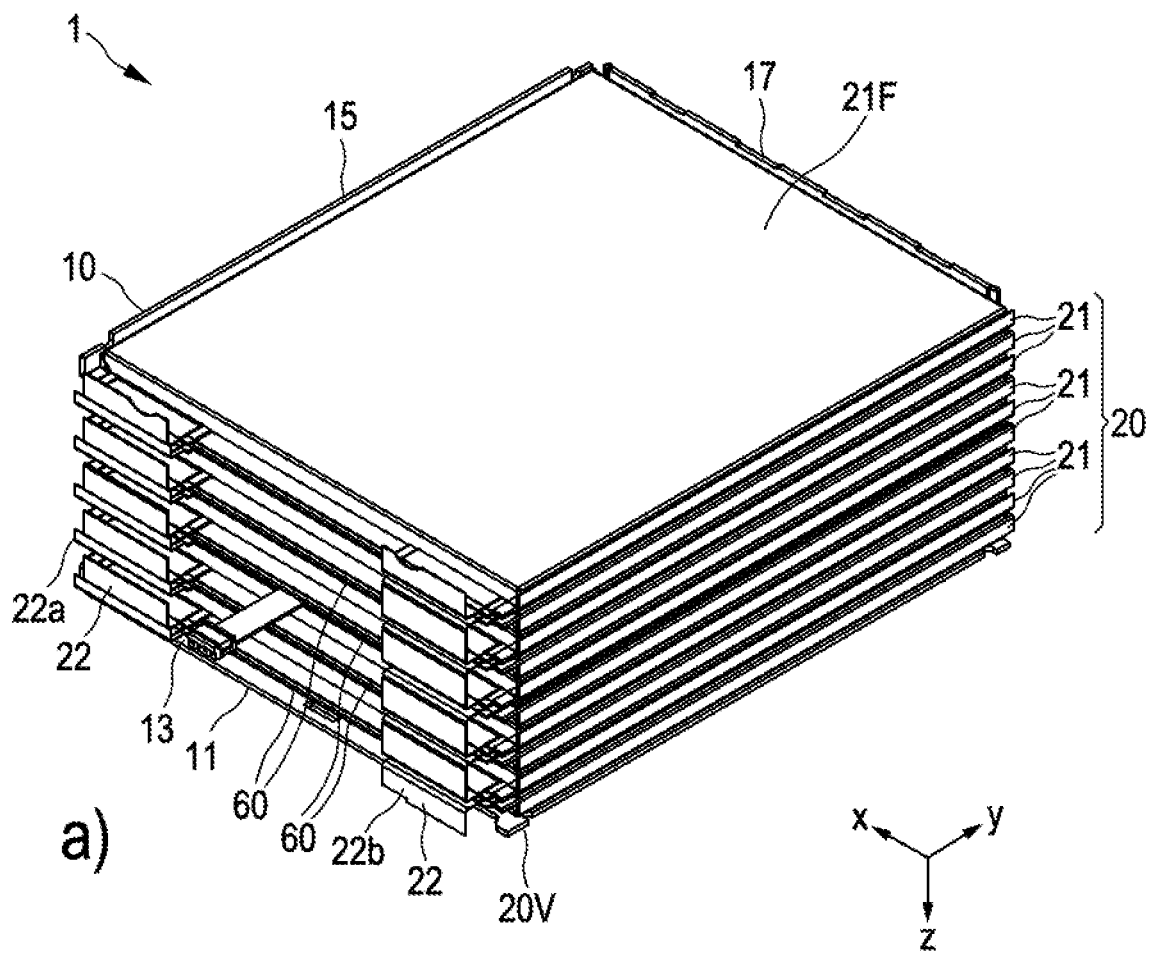
FIG. 5 shows a perspective view of the first housing part, of pouch cells, the pressure sensor and the inner temperature sensor disposed in a stack of the battery pack from FIG. 1 and a method.
Figure 6:
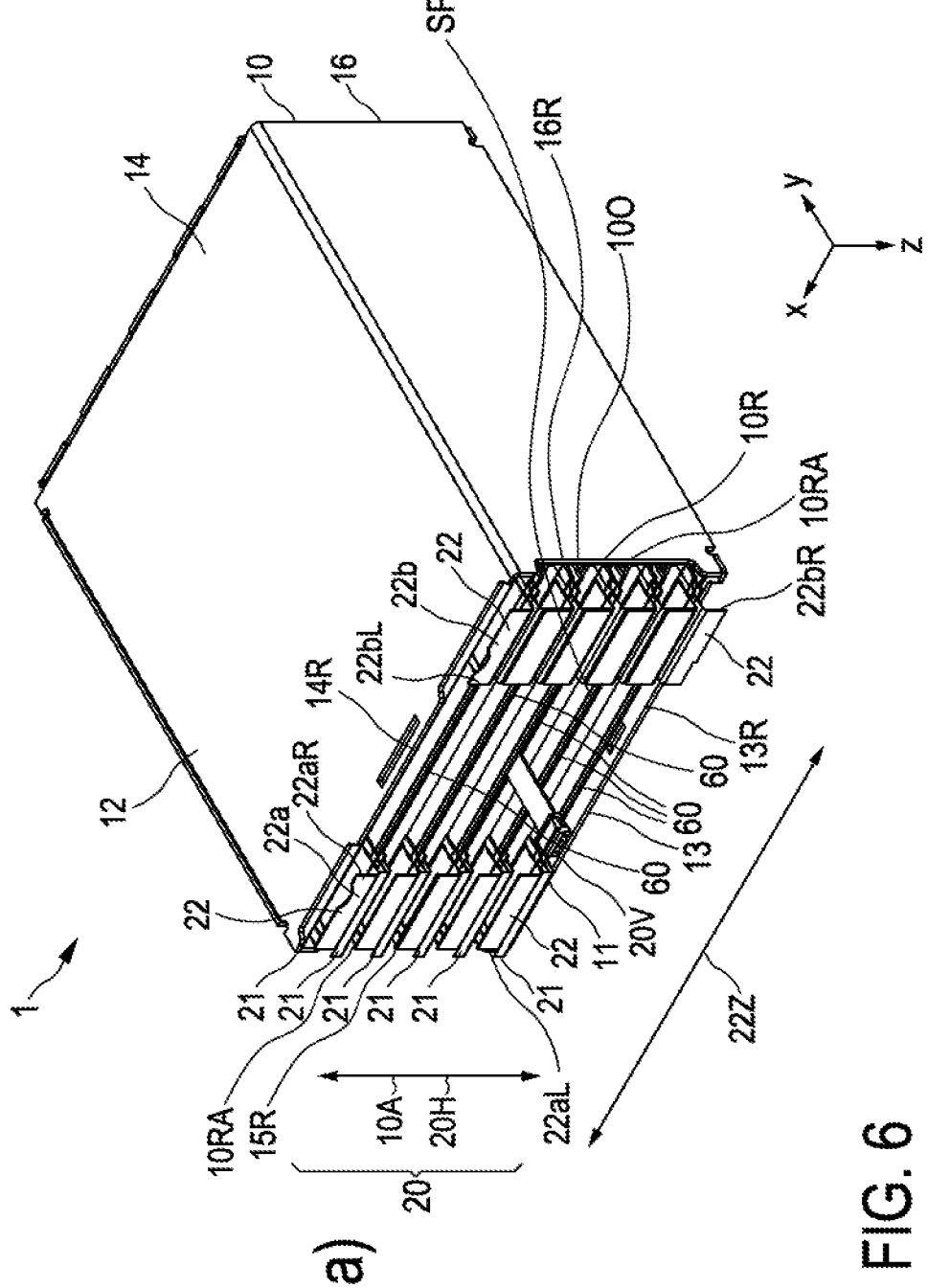
FIG. 6 shows a perspective view of the first housing part, the stack and a second housing part of a stack housing of the battery pack from FIG. 1 and a method.

In addition, the pouch cells 21 are configured and disposed in the stack 20 within the stack housing 10 such that the cell tabs 22 are disposed on a common tab side, in particular front side, 20 V of the stack 20, in particular on the common housing opening 10O, as illustrated in FIGS. 5 to 7.

The step a) comprises: disposing pouch cells 21 such, wherein the pouch cells 21 are configured such that the cell tabs 22 are disposed on the common tab side 20 V of the stack 20.

Furthermore, the housing edge 10R defines an opening plane 10E, in particular in parallel to the tab side 20V, of the housing opening 10O. The tab parts 22T extend in parallel to the opening plane 10E.

In the exemplary embodiment shown, the tab parts 22T, in particular in each case, of next pouch cells 21 cover or overlap each other, in particular in the stack direction z.

Figure 8:
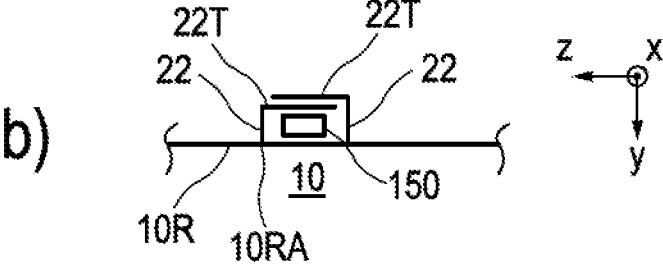
FIG. 8 shows a lateral view of the stack housing and of cell tabs with tab parts of the pouch cells of the battery pack from FIG. 1 and a welding base or fixture and the method.

Moreover, the step b) comprises: disposing a welding base 150, in particular of a welding anvil, at least partially between at least one of the tab parts 22T extending in parallel and the edge portion 10RA, in particular parallel to the tab part 22T, and welding the tab part 22T by means of the welding base 150, as illustrated in FIG. 8.

In the exemplary embodiment shown, the tab parts 22T are parts of the cell tabs 22, in particular parts of the cell tabs 22 bent from the direction −y to the direction z, −z, and project, in particular in each case, beyond a next edge portion 10RA, in particular in each case, in prolongation of a bending axis of the cell tabs 22.

Further, the battery pack 1 has at least one electric power connector 29, in the exemplary embodiment shown, two power connectors 29. The electric power connector 29 is electrically connected, in particular directly, to one of the tab parts 22T by a welded connection 29S.

The step a) comprises: disposing the at least one electric power connector 29 on the tab part 22T, in particular in time after arrangement of the pouch cells 21. The step b) comprises: welding the at least one electric power connector 29 to the tab part 22T, for electrical connecting, in particular direct electrical connecting, of the power connector 29 to the tab part 22T.

In the exemplary embodiment shown, the electric power connector 29 is disposed at least partially between the tab part 22T extending in parallel and the edge portion 10RA, in particular in parallel to the tab part 22T.

Moreover, the stack housing 10 is cuboid shaped and has at least four, in the exemplary embodiment shown five housing walls 13, 14, 15, 16, 17. The wall edges 13R, 14R, 15R, 16R of four of the housing walls 13, 14, 15, 16 define the structure opening 10O; in particular on the peripheral side, as illustrated in FIG. 6.

One of the, in particular four, housing walls is a first housing wall 13. Another one of the, in particular four, housing walls is a second housing wall 14.

The second housing wall 14 is disposed opposite and with a distance 10A to the first housing wall 13. The stack 20 is disposed between the first housing wall 13 and the second housing wall 14. A height 20H of the stack 20 in the stack direction z is limited by the first housing wall 13 and the second housing wall 14.

Figure 3:
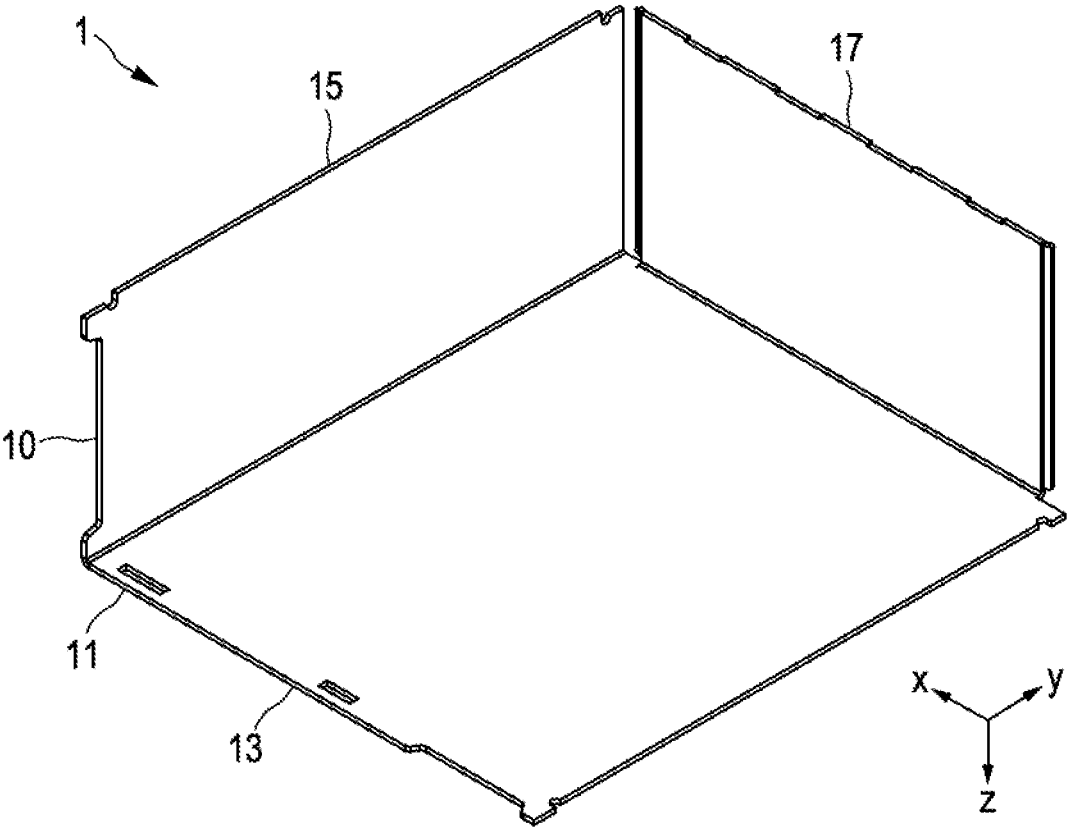
FIG. 3 shows a perspective view of a first housing part of a stack housing of the battery pack from FIG. 1.

In detail, the stack housing 10 has a first housing part 11, as illustrated in FIG. 3, and a second housing part 12, as illustrated in FIG. 6. The first housing part 11 has the first housing wall 13. The second housing part 12 has the second housing wall 14. Furthermore, the first housing part 11 and the second housing part 12 are mechanically connected to each other, in particular directly, by at least one welded connection 10S, as illustrated in FIG. 7.

The step a) comprises: disposing the stack 20 on the first housing wall 13 and, in time thereafter, disposing the second housing wall 14 on the stack 20 such that the second housing wall 14 is disposed opposite the first housing wall 13 with the distance 10A, that the stack 20 is disposed between the first housing wall 13 and the second housing wall 14, and the height 20H of the stack 20 in the stack direction z is limited by the first housing wall 13 and the second housing wall 14. The step b) comprises: welding the first housing part 11 and the second housing part 12 for mechanical connecting, in particular directly, of the first housing part 11 and the second housing part 12 to each other.

In the exemplary embodiment shown, the first housing part 11 has the first housing wall or top side wall 13, the housing wall, in particular peripheral side wall, 15 and the housing wall, in particular the rear side wall, 17. The second housing part 12 has the second housing wall or bottom side wall 14 and the housing wall, in particular peripheral side wall, 16.

Moreover, in the exemplary embodiment shown, the first housing wall 13 and the second housing wall 14 respectively extend in directions x, y orthogonal to the stack direction z. Further, in the exemplary embodiment shown, the distance 10A is in the stack direction z. Additionally in the exemplary embodiment shown, the height 20H is equal to the distance 10A.

Figure 4:
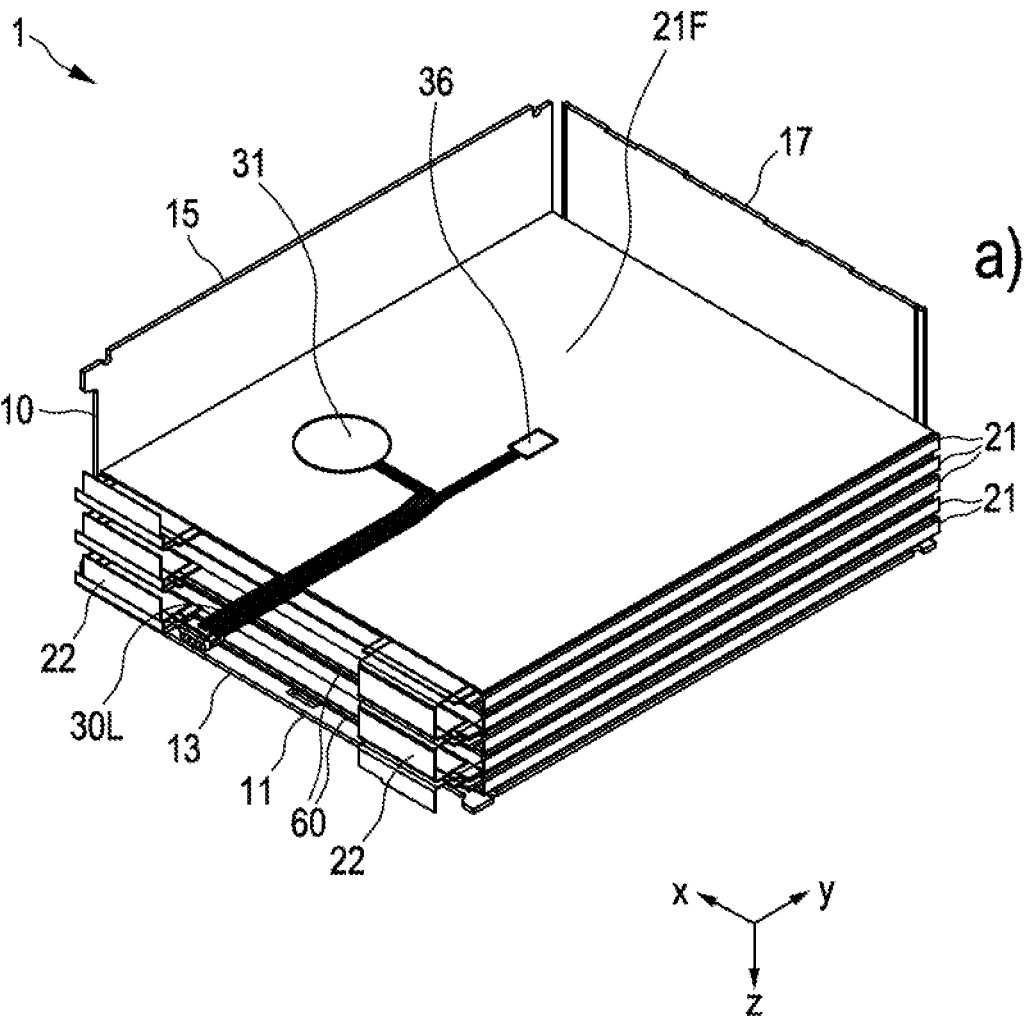
FIG. 4 shows a perspective view of a first housing part, of pouch cells, a pressure sensor and an inner temperature sensor of the battery pack from FIG. 1 and a method.

Furthermore, the battery pack 1 comprises at least one compensation element 60, as illustrated in FIGS. 4 to 6. The at least one compensation element 60 is disposed in the stack 20. Furthermore, the at least one compensation element 60 extends across a major part of a surface 21F of the pouch cells 21 and is configured to adjust, in particular to match, across a compensation thickness 60D of the at least one compensation element 60, the height 20H of the stack 20 to the distance 10A between the first housing wall 13 and the second housing wall 14, and in particular to buffer inflating, where present, of the pouch cells 21 in the stack direction z.

In the exemplary embodiment shown, the battery pack 1 includes five compensation elements 60. In alternative exemplary embodiments, the battery pack can include only one single compensation element.

Particularly, two of the pouch cells 21 are disposed between in each case two of the compensation elements 60. This allows that the cell tabs 22 can be equal, in particular the tab parts 22 in the stack direction z can have the same length.

Further, in the exemplary embodiment shown, the at least one compensation element 60 extends in directions x, y orthogonal to the stack direction z. Furthermore, in the exemplary embodiment shown, the at least one compensation element 60 extends across the complete surface 21F of the pouch cells 21.

In addition, in the exemplary embodiment shown, the at least one compensation element 60 is a thermal insulation.

Furthermore, the pouch cells 21 are configured and disposed in the stack 20 such that the cell tabs 22 are disposed in two tab columns 22a, 22b, as illustrated in FIGS. 5 to 7.

Averted end limits 22aL, 22bR of the tab columns 22a, 22b define an intermediate zone 22Z. The battery pack 1 comprises a circuit board 52. The circuit board 52 is disposed within the intermediate zone 22Z and electrically connected to a number of the cell tabs 22, in particular tab parts 22T, in particular in each case, by a welded connection 52S.

The step a) comprises: disposing pouch cells 21 in the stack 20 such, wherein the pouch cells 21 are configured such that the cell tabs 22 are disposed in the two tab columns 22a, 22b, wherein the averted end limits 22aL, 22bR of the tab columns 22a, 22b define the intermediate zone 22Z. Disposing the circuit board 52 within the intermediate zone 22Z, in particular in time after the arrangement of the pouch cells 21. The step b) comprises: welding the circuit board 52 to the number of cell tabs 22, in particular tab parts 22T, in particular in each case, for electrical connecting the circuit board 52 to the cell tabs 22, in particular tab parts 22T.

In the exemplary embodiment shown, the tab columns 22a, 22b are or extend in the stack direction z. Moreover, in the exemplary embodiment shown, the averted end limits 22aL, 22bR of the tab columns 22a, 22b define or delimit the intermediate zone 22Z in the direction x, –x orthogonal to the stack direction z.

Further, in the exemplary embodiment shown, the circuit board 52 is disposed between the tab columns 22a, 22b, in particular between facing end limits 22aR, 22bL of the tab columns 22a, 22b. Moreover, in the exemplary embodiment shown, the circuit board 52 is disposed on the tab side, in particular front side, 20V on the stack 20 and on the housing opening 10O.

In detail, the battery pack 1 comprises a frame 59. The frame 59 supports the circuit board 52 and is disposed on the housing opening 10O. The cell tabs 22, in particular tab parts 22T, and the circuit board 52 are positioned in relation to each other by means of the stack housing 10 and the frame 59.

The step a) comprises: disposing the frame 59 on the structure opening 10O such that the cell tabs 22, in particular the tab parts 22T, and the circuit board 52 are positioned in relation to each other by means of the stack housing 10 and the frame 59, in particular in time after arrangement of the pouch cells 21.

In the exemplary embodiment shown, the cell tabs 22, in particular tab parts 22T, are disposed on the housing opening 10O.

Furthermore, in the exemplary embodiment shown, the circuit board 52 is disposed with a board plane 52E in parallel to the tab side 20V. In particular, the board plane 52E corresponds to a tab plane 22E defined by the tab columns 22a, 22b, in particular by the tab parts 22T extending in parallel.

Moreover, in the exemplary embodiment shown, the circuit board 52 holds measuring electronics 55. The measuring electronics 55 are configured for measuring voltages SP of the pouch cells 21.

Further, in the exemplary embodiment shown, electrical connections 52eV', in particular electrical cell connectors 52eV", between the circuit board 52, in particular the measuring electronics 55, and a number of the cell tabs 22, in particular tab parts 22T, are identical, in particular are short.

Additionally, in the exemplary embodiment shown, the circuit board 52, in particular the measuring electronics 55, is/are electrically connected to the number of the cell tabs 22, in particular tab parts 22T, by means of the electrical cell connectors 52eV", and in particular by the welded connections 52S.

The step b) comprises: welding the electrical cell connectors 52eV" to the number of the cell tabs 22, in particular tab parts 22T, in particular in each case, for electrical connecting of the electrical cell connectors 52eV" to the cell tabs 22, in particular tab parts 22T.

Further, in the exemplary embodiment shown, the cell connectors 52eV" are inflexible.

In particular, the cell connectors 52eV" are connected, in time before step a), with a respective end to the circuit board 52, in particular mechanically connected. Thus, the cell connectors 52eV" are positioned with a respective other end on the cell tabs 22, in particular tab parts 22T, in time after step a) and in time before step b).

Moreover, in the exemplary embodiment shown, the cell connectors 52eV", in particular in each case, project beyond a board edge 52R of the circuit board 52, in particular in the direction x, –x orthogonal to the stack direction z, of at least one of the end limits 22aL, 22bR of the tab columns 22a, 22b.

Further, in the exemplary embodiment shown, the cell connectors 52eV" are disposed farther remote than the tab parts 22T, in particular the number of tab parts 22T, from the stack 20 or outer shells of the pouch cells 21.

Figure 9:
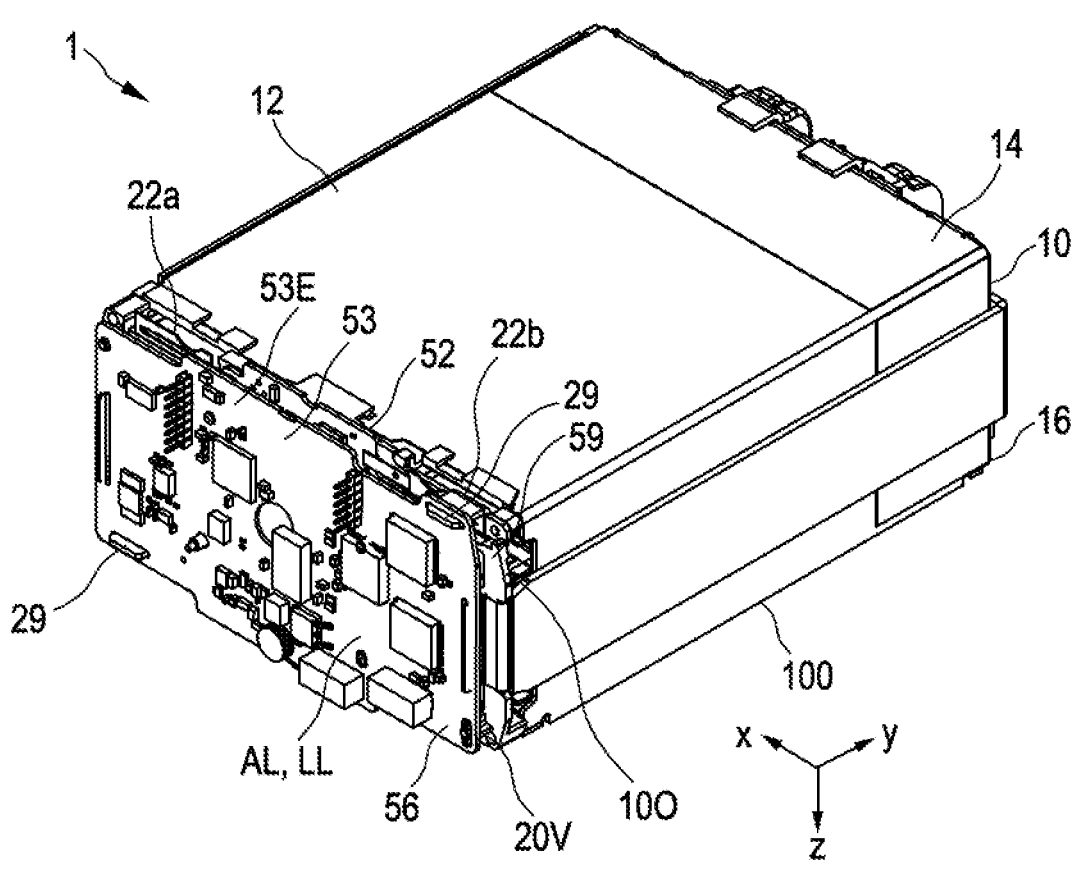
FIG. 9 shows a perspective view of the first housing part, the stack, the second housing part, the circuit board and a further circuit board of the battery pack from FIG. 1.

Additionally, in the exemplary embodiment shown, the battery pack 1 comprises a further circuit board 53, as illustrated in FIG. 9. The further circuit board 53 is disposed on the tab side, in particular front side, 20V farther remote from the stack 20 than the circuit board 52, in particular with a further board plane 53E in parallel to the tab side 20V.

The further circuit board 53 is wider than the tab columns 22a, 22b.

In addition, the further circuit board 53 holds power electronics 56. The power electronics 56 are configured for controlling, in particular automatic controlling, in particular stopping, the output of the driving power AL from the battery pack 1 and/or an input of charging power LL to the battery pack 1, in particular in response to the measured voltages SP.

In the exemplary embodiment shown, the width of the further circuit board 53 corresponds to, in particular is identical to, a width of the stack 20, in particular in the direction x orthogonal to the stack direction z.

Furthermore, in the exemplary embodiment shown, the frame 59 and/or the circuit board 52 support/supports the further circuit board 53.

Moreover, in the exemplary embodiment shown, the further circuit board 53, in particular the power electronics 56, is/are electrically connected to the circuit board 52, in particular the measuring electronics 55.

Further, in the exemplary embodiment shown, the further circuit board 53, in particular the power electronics 56, is/are electrically connected to the at least one electric power connector 29.

In particular, the circuit board 52, in particular the measuring electronics 55, is/are electrically connected via the electrical cell connectors 52eV" to all of the cell tabs 22, with the exception of the ground (GND) cell tabs 22-0. cell potential—and the nominal voltage (NSP) cell tab 22 of the battery pack 1-10. cell potential. The circuit board 52, in particular the measuring electronics 55, is/are electrically connected to the ground cell tab 22 and the nominal voltage NSP cell tab 22 via the electrical power connectors 29 and the further circuit board 53. In alternative embodiments, the circuit board, in particular the measuring electronics, can be electrically connected to the ground cell tab and/or the nominal voltage cell tab, in particular in each case, via an electrical cell connector.

Figure 11:
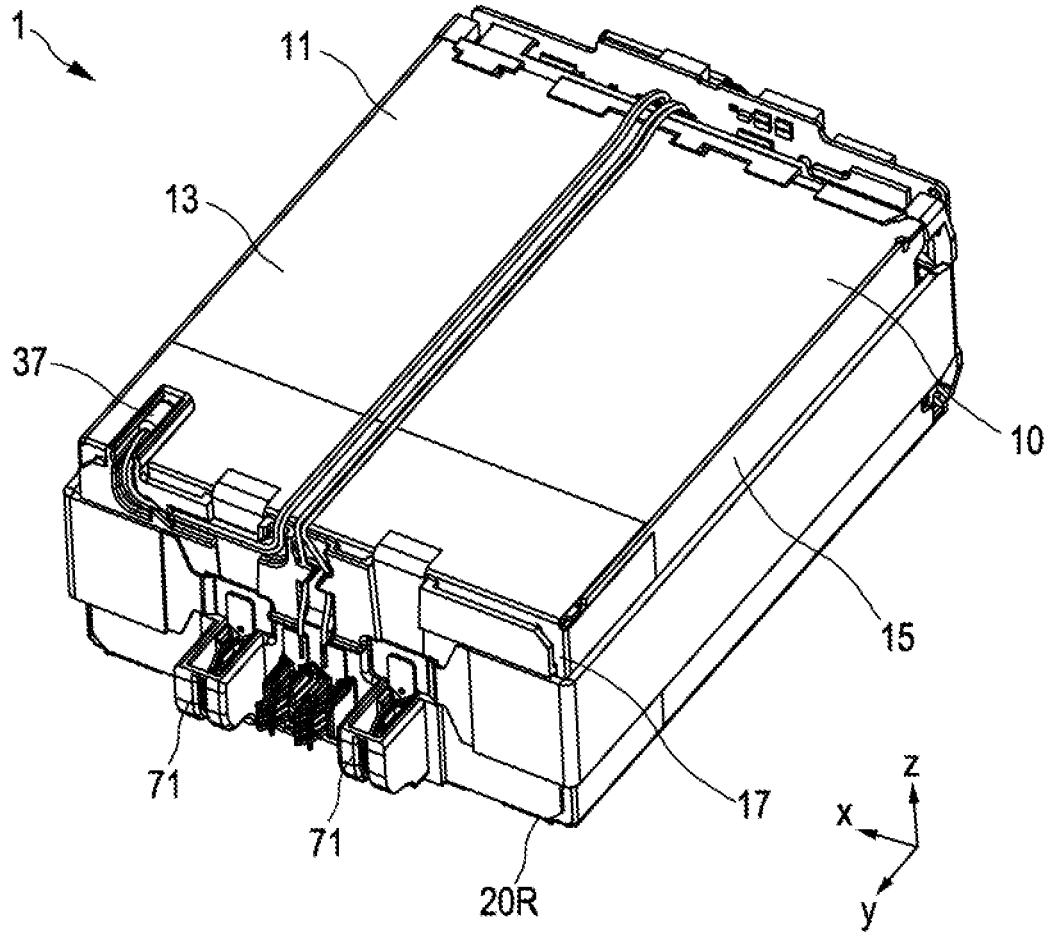
FIG. 11 shows a perspective view of a rear side of the first housing part, the stack, the second housing part, the circuit board, the further circuit board, the yet another further circuit board and an outer temperature sensor of the battery pack from FIG. 1.

Additionally, in the exemplary embodiment shown, the battery pack 1 comprises a plurality of battery pack contacts 71, as illustrated in FIG. 11. The battery pack contacts 71 are configured for electrical connection of the battery pack 1 and the treatment apparatus 101 to each other for supplying the treatment apparatus 101 with electric driving power AL from the battery pack 1. Furthermore, the further circuit board 53, in particular the power electronics 56, is/are electrically connected to the battery pack contacts 71.

In particular, the battery pack contacts 71 are disposed on a rear side 20R of the stack 20 opposite the tab side, in particular front side, 20V of the stack 20, in particular on the stack housing 10, in particular on the housing wall or rear side wall 17.

Figure 10:
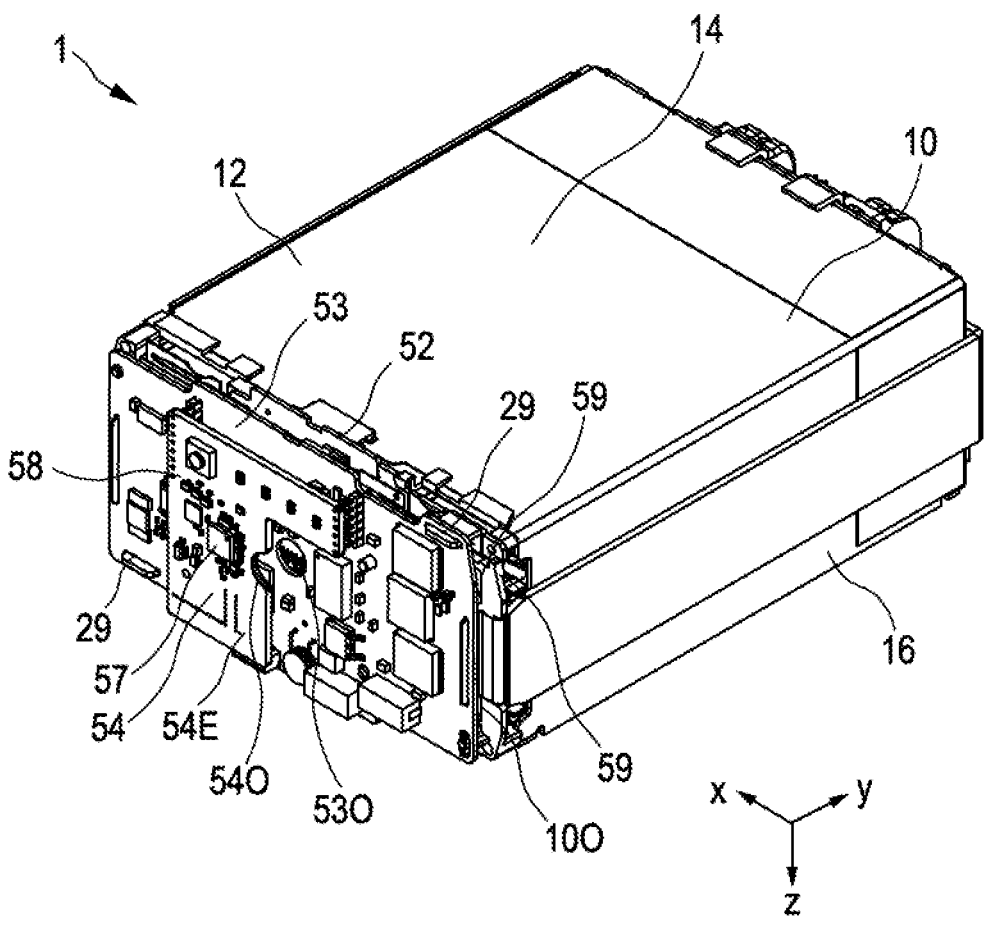
FIG. 10 shows a perspective view of the first housing part, the stack, the second housing part, the circuit board, the further circuit board and yet another further circuit board of the battery pack from FIG. 1.

Furthermore, in the exemplary embodiment shown, the battery pack 1 comprises a further circuit board 54, in particular yet another further circuit board 54, as illustrated in FIG. 10. The further circuit board 54, in particular yet another further circuit board 54, is disposed on the tab side, in particular front side, 20V farther remote from the stack 20 than the circuit board 52, and in particular than the further circuit board 53, in particular with a further board plane, in particular yet another further board plane, 54E parallel to the tab side 20V. The further circuit board 54, in particular yet another further circuit board 54, holds user interface electronics 57 and transmission electronics 58. The user interface electronics 57 are configured for interaction, in particular automatic interaction, with a user. The transmission electronics 58 are configured for wireless transmission, in particular automatic wireless transmission, of at least one operating parameter and/or operating condition.

In the exemplary embodiment shown, the interface electronics 57 are configured for output, in particular display, of a charging condition of the battery pack 1.

Further, in the exemplary embodiment shown, the further circuit board 53 supports the further circuit board 54, in particular yet another further circuit board 54.

Additionally, in the exemplary embodiment shown, the further circuit board 54, in particular yet another further circuit board 54 is, in particular the user interface electronics 57 and the transmission electronics 58 are, electrically connected to the circuit board 52, in particular the measuring electronics 55, and/or the further circuit board 53, in particular the power electronics 56.

Figure 14:
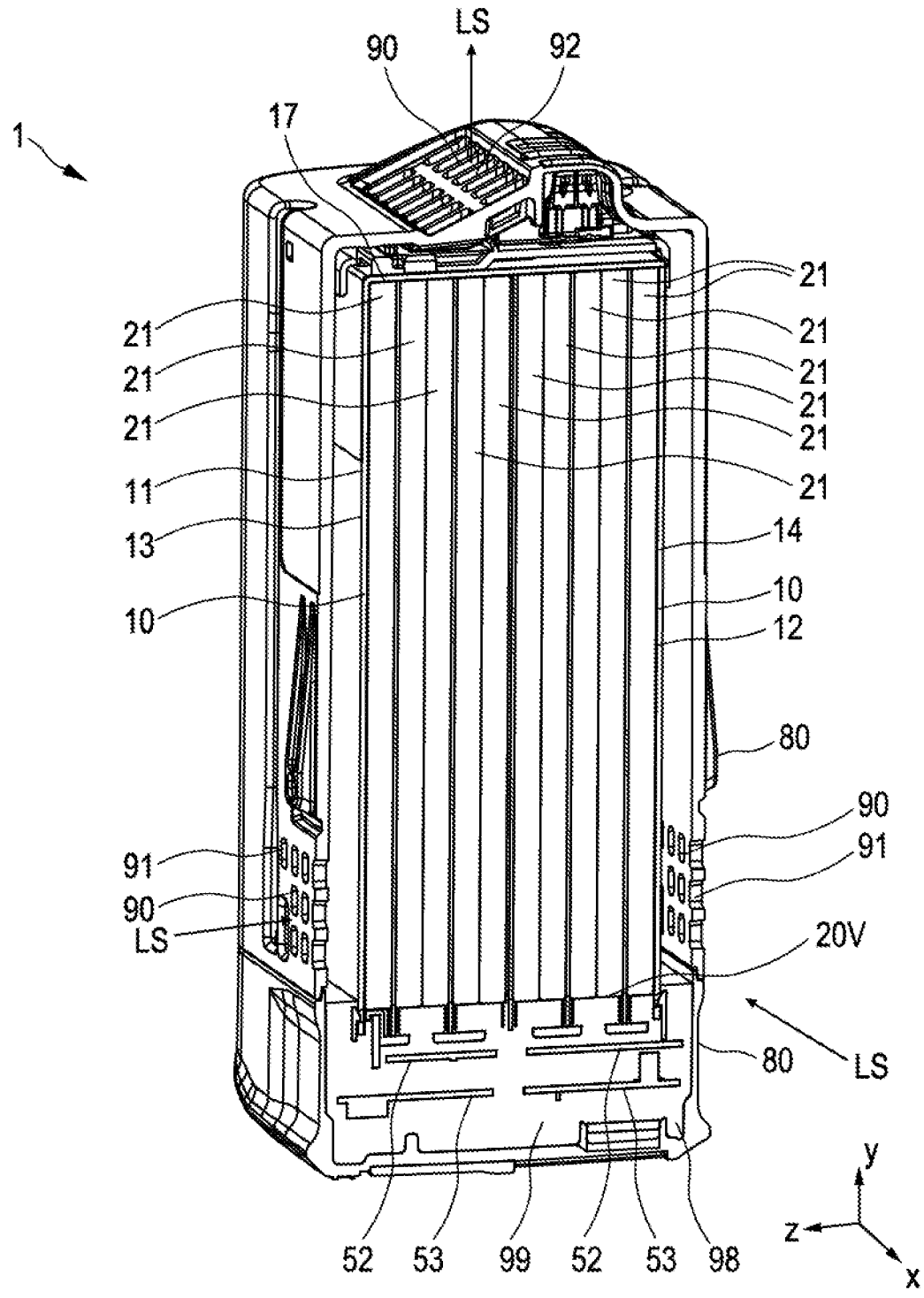
FIG. 14 shows a sectional view of the battery pack from FIG. 1 including casting compound.

Furthermore, in the exemplary embodiment shown, the circuit board 52, and in particular the at least one further circuit board 53, 54 has, in particular in each case, a recess 52O, 53O, 54O, in particular a through hole. The recess 52O, 53O, 54O is configured for passing through a sensor line 30L, for a flow of casting compound 99, as illustrated in FIG. 14, and/or for positioning the circuit board 52, in particular the circuit boards 52, 53, 54 in relation to each other.

In the exemplary embodiment shown, the battery pack 1 has a pressure sensor 31, as illustrated in FIG. 4. The pressure sensor 31 is configured for detecting, in particular measuring, a pressure force acting in the stack direction z on the pouch cells 21. Moreover, the battery pack 1 has an inner temperature sensor 36. The inner temperature sensor 36 is configured for measuring an inner temperature of the stack 20. The sensor line 30L is from the pressure sensor 31 and the inner temperature sensor 36. The circuit board 52, in particular the measuring electronics 55, is/are electrically connected to the pressure sensor 31 and the inner temperature sensor 36 by means of the sensor line 30L.

Figure 12:
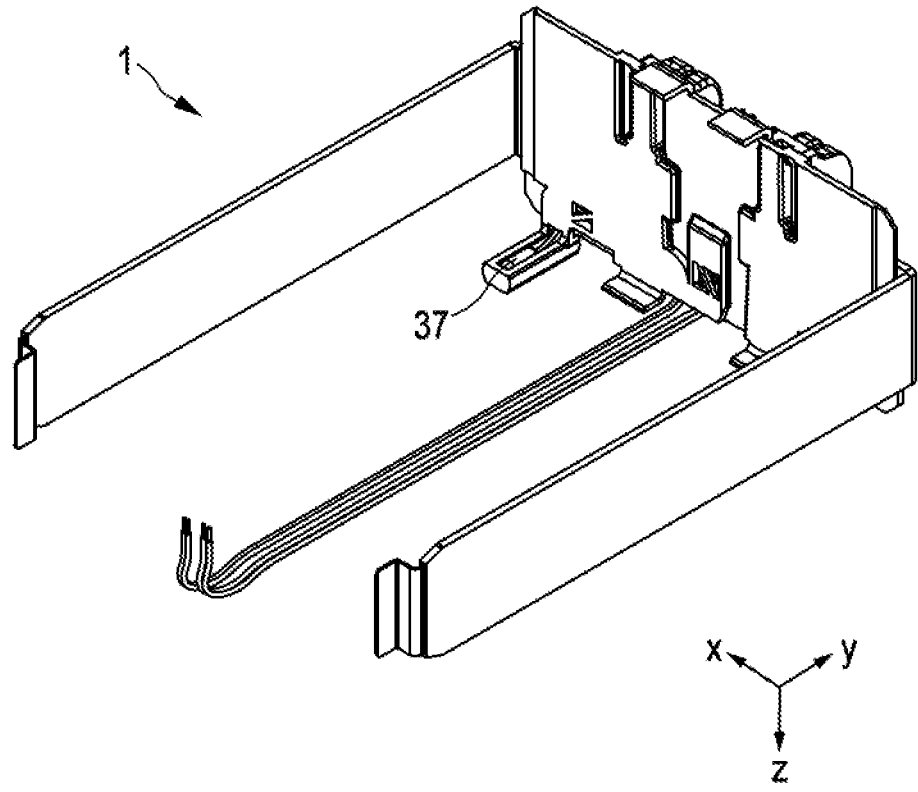
FIG. 12 shows a perspective view of the outer temperature sensor of the battery pack from FIG. 1.

Moreover, in the exemplary embodiment shown, the battery pack 1 has an outer temperature sensor 37, as illustrated in FIGS. 11 and 12. The outer temperature sensor 37 is configured for measuring an outer temperature of the stack 20. The circuit board 52, in particular the measuring electronics 55, is/are electrically connected to the temperature sensor 37.

Further, in the exemplary embodiment shown, the power electronics 56 are configured for controlling the output of driving power AL from the battery pack 1 and/or the input of charging power LL to the battery pack 1 in response to the detected, in particular measured, pressure force, the measured inner temperature and the measured outer temperature.

Additionally, in the exemplary embodiment shown, the cell tabs 22 and the at least one circuit board 52, 53, 54 are enclosed by the, in particular thermally conductive, casting compound 99, in particular in a common casting block 98. The casting compound 99 reaches up to outer shells of the pouch cells 21.

Figure 13:
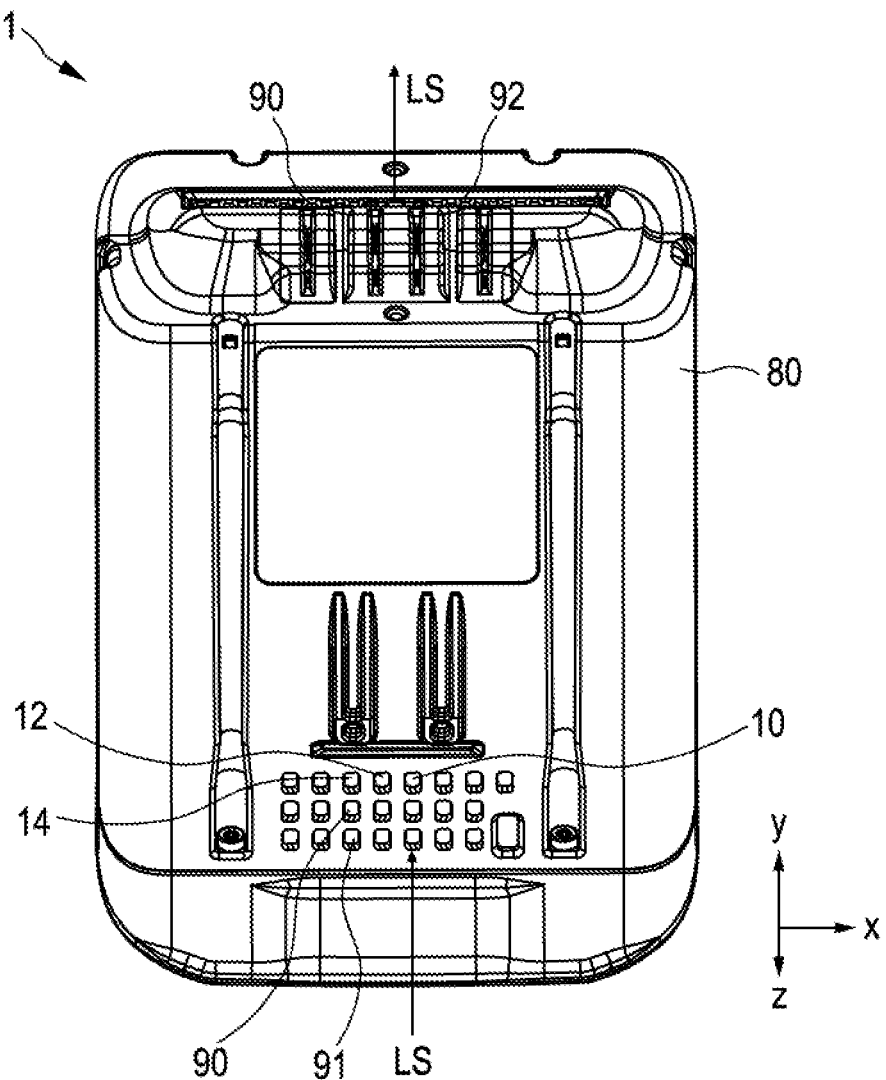
FIG. 13 shows a perspective view of a battery pack housing of the battery pack from FIG. 1.

Furthermore, in the exemplary embodiment shown, the battery pack 1 comprises a battery pack housing 80, as illustrated in FIGS. 13 and 14. The pouch cells 21, and in particular the circuit board 52, the measuring electronics 55, the electrical cell connectors 52eV", the at least one electric power connector 29, the stack housing 10, the frame 59, the further circuit board 53, the power electronics 56, the further circuit board 54, in particular the yet another further circuit board 54, the user interface electronics 57, the transmission electronics 58, the pressure sensor 31, the inner temperature sensor 36, the outer temperature sensor 37, and the casting compound 99 are disposed within the battery pack housing 80.

In particular, the battery pack housing 80 is configured as a mold for the casting compound 99.

Moreover, in the exemplary embodiment shown, the battery pack 1 comprises at least one air cooling circuit 90 including a number of air inlet openings 91 and a number of air outlet openings 92 in the battery pack housing 80 for a cooling air flow LS passing from the number of air inlet openings 91 on the pouch cells 21, in particular the stack housing 10, to the number of air outlet openings 92 for cooling the pouch cells 21. The outer temperature sensor 37 is disposed in the cooling circuit 90 between the number of air inlet openings 91 and the number of air outlet openings 92, in particular facing the number of air inlet openings 91 and/or the number of air outlet openings 92.

Further, in the exemplary embodiment shown, the stack housing 10 has a thermal connection to the pouch cells 21 and is thermally conductive.

In particular, the stack housing 10 makes physical contact, in particular the housing walls 13, 14, 15, 16, 17 make physical contact, to the pouch cells 21, and heat-conducting paste is provided between the pouch cells 21 and the housing walls 15, 16, 17.

Additionally, in the exemplary embodiment shown, the battery pack 1 has a maximum electric driving power MAL of 3 kW. In alternative exemplary embodiments, the battery pack can have a maximum electric driving power of a minimum of 1 kW and/or a maximum of 10 kW.

In addition, in the exemplary embodiment shown, the battery pack 1 has a nominal voltage NSP of 36 V. In alternative exemplary embodiments, the battery pack can have a nominal voltage of a minimum of 10 V and/or a maximum of 100 V.

In addition, in the exemplary embodiment shown, the battery pack 1 has a maximum energy content MEI of 337 Wh. In alternative exemplary embodiments, the battery pack can have a maximum energy content of a minimum of 100 Wh and/or a maximum of 1000 Wh.

In addition, in the exemplary embodiment shown, the battery pack 1 has a mass m1 of 2 kg. In alternative exemplary embodiments, the battery pack can have a mass of a minimum of 0.5 kg and/or a maximum of 10 kg.

In addition, in the exemplary embodiment shown, the battery pack 1 has a height 1H, in particular in the stack direction z, of 5 cm, a width 1B, in particular in the direction x, of 10 cm, and a depth 1T, in particular in the direction y, of 15 cm. In alternative exemplary embodiments, the battery pack can have a height of a minimum of 2.5 cm and/or of a maximum of 10 cm, and/or a width of a minimum of 5 cm and/or of a maximum of 20 cm, and/or a depth of a minimum of 7.5 cm and/or of a maximum of 30 cm.

Figure 1:
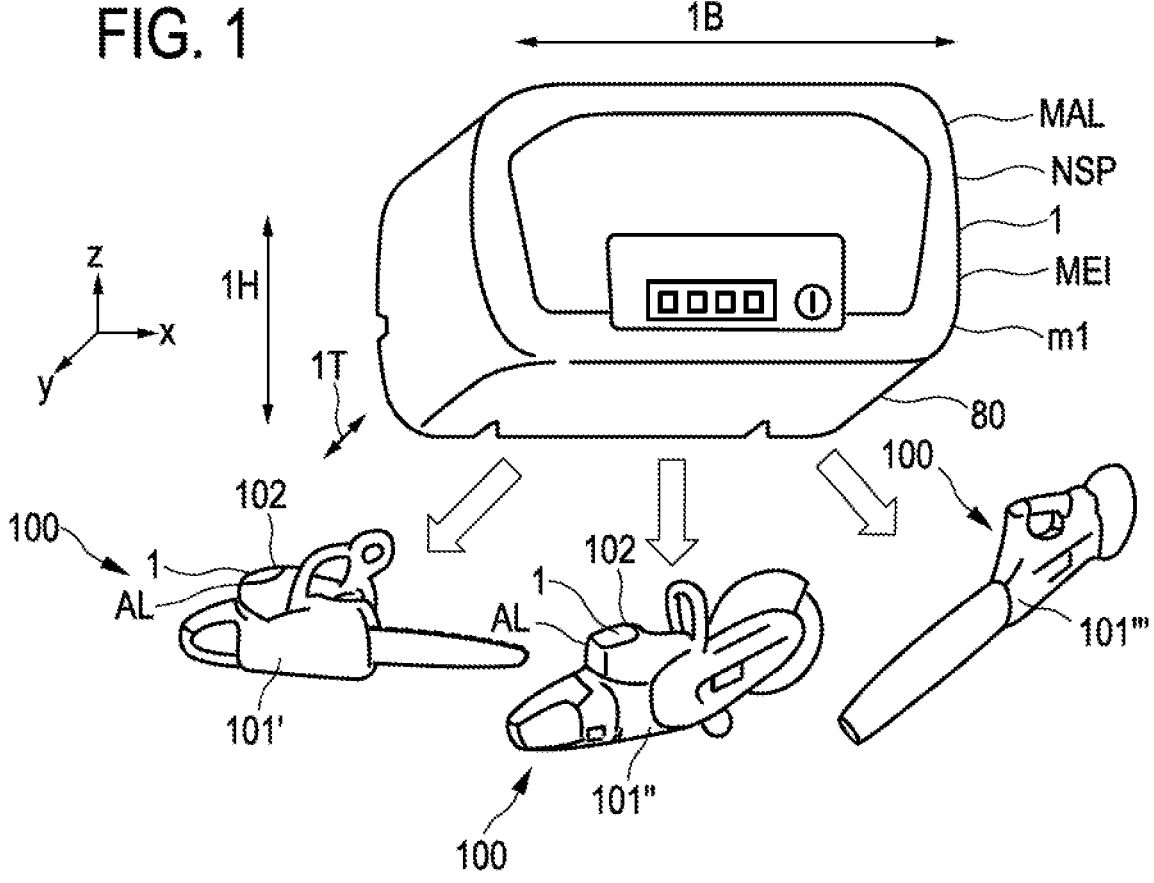
FIG. 1 shows a perspective view of a treatment system including a battery pack and an electrically driven treatment apparatus in the form of a saw, a cutoff grinder and a blower device.
Figure 2:
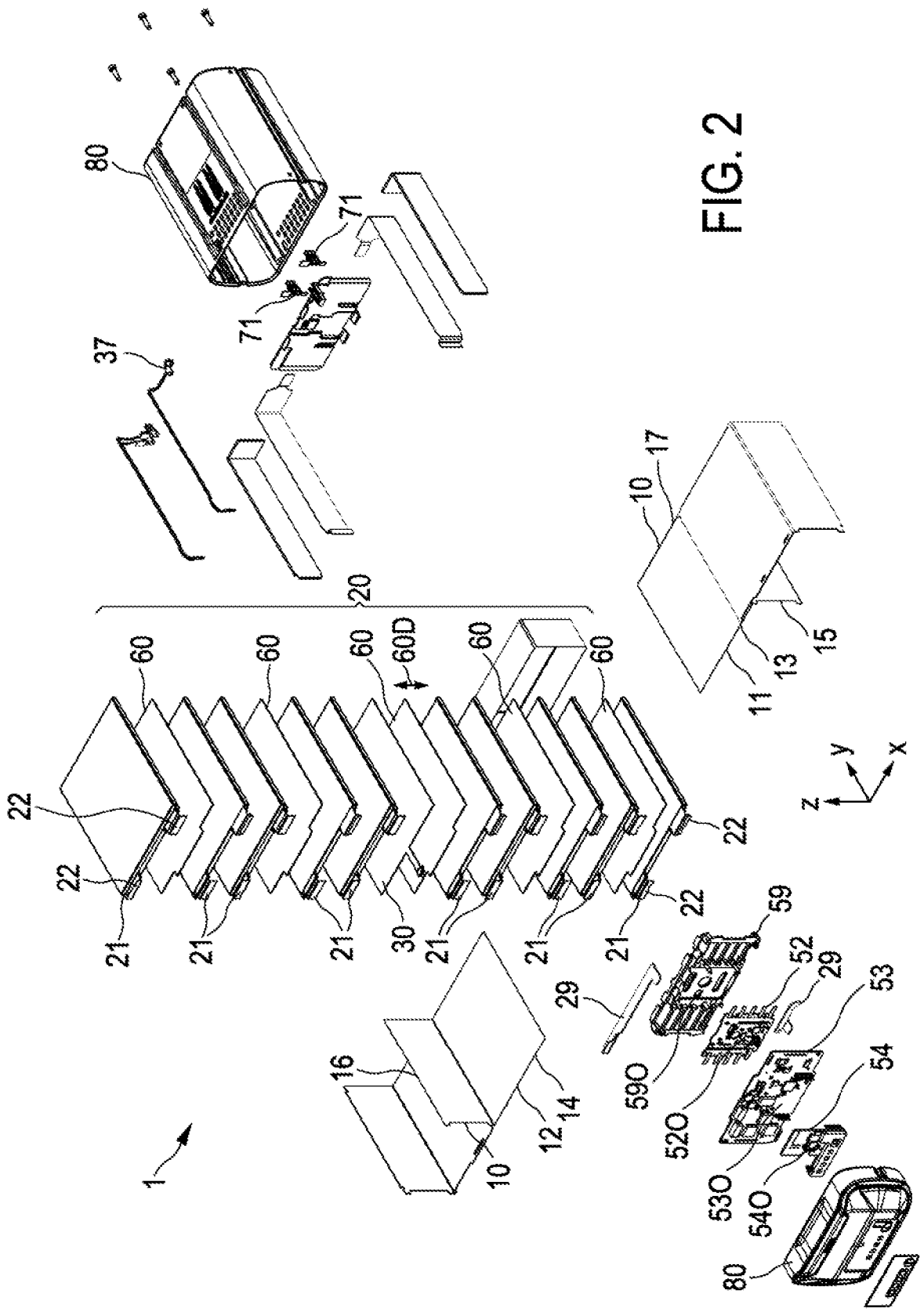
FIG. 2 shows an exploded view of the battery pack from FIG. 1.

FIG. 1 shows a treatment system 100 according to the invention. The treatment system 100 comprises the battery pack 1 and an electrically driven treatment apparatus 101. The battery pack 1 and the treatment apparatus 101 are configured for electrical connection with each other for supplying the treatment apparatus 101 with electric driving power AL from the battery pack 1, in particular are electrically connected.

In detail, the treatment apparatus 101 has a battery accommodation 102. The battery accommodation 102 is configured for accommodating the battery pack 1. In particular, the battery pack 1 is accommodated.

In the illustration of FIG. 1, the electrically driven treatment apparatus 101 is a saw 101', a cutoff grinder 101", or a blower device 101'''. In alternative exemplary embodiments, the treatment apparatus can be a pole pruner, a clearing saw, a brush cutter, hedge shears, a hedge cutter, a leaf blower, a lopper, a sweeper device, a sweeper roller, a sweeper brush, a lawn mower, a dethatcher, or a grass trimmer.

As is made clear by the illustrated and above explained exemplary embodiments, the invention provides a battery pack for supplying an electrically driven treatment apparatus with electric driving power, a treatment system including such a battery pack and an electrically driven treatment apparatus, and a method for the production of a battery pack for supplying an electrically driven treatment apparatus with electric driving power, wherein the battery pack and the method each have improved properties.

What is claimed is:

1. A battery pack for supplying an electrically driven treatment apparatus with an electric driving power, the battery pack comprising:

a stack housing, wherein the stack housing has a common housing opening defined by a housing edge; and a plurality of pouch cells having outer shells, wherein the plurality of pouch cells have cell tabs and are configured and disposed in a stack within the stack housing such that the cell tabs at least with tab parts project beyond at least one edge portion of the housing edge on the common housing opening without any housing wall or cover disposed between the tab parts and the outer shells, wherein the tab parts are directly electrically connected to each other solely by welded connections;

a circuit board holding measuring electronics configured for measuring voltages of all of the plurality of pouch cells;

wherein the housing edge defines an opening plane of the common housing opening, the tab parts extend in a stacking direction of the plurality of pouch cells in parallel to the opening plane, the stack housing is cuboid shaped and has at least four housing walls, wherein wall edges of four of the housing walls define the common housing opening, the at least four housing walls include a first housing wall and a second housing wall, the second housing wall is disposed opposite and with a distance to the first housing wall, the stack is disposed between the first housing wall and the second housing wall, and a height of the stack in a stack direction is limited by the first housing wall and the second housing wall, a frame, where in the frame supports the circuit board and is disposed on the common housing opening in parallel to the opening plane, wherein the circuit board is supported on an outer surface of the frame remote from the plurality of pouch cells, wherein the cell tabs and the circuit board are positioned in relation to each other by way of the stack housing and the frame, the frame having openings exposing the tab parts of the cell tabs; and at least one compensation element disposed in the stack between adjacent ones of the plurality of pouch cells, the at least one compensation element extends across a major part of a surface of the plurality of pouch cells and is configured to adjust the height of the stack to the distance between the first housing wall and the second housing wall across a compensation thickness of the at least one compensation element, the stack housing has a first housing part and a second housing part, the first housing part includes the first housing wall and a third housing wall of the at least four housing walls, the second housing part includes the second housing wall and a fourth housing wall of the at least four housing walls, the first housing part and the second housing part are mechanically connected to each other by at least one welded connection, when the first housing part and the second housing part are mechanically connected to each other, the fourth housing wall is disposed opposite and spaced apart from the third housing wall, none of the at least four housing walls overlaps another one of the at least four housing walls, the plurality of pouch cells are configured and disposed in the stack such that the cell tabs are disposed in two tab columns, wherein averted end limits of the tab columns define an intermediate zone, the circuit board is disposed within the intermediate zone and electrically connected, via electrical cell connectors, to a number of the cell tabs in each case by a welded connection, the electrical cell connectors in each case project beyond a board edge of the circuit board, and are disposed farther remote from the stack or outer shells of the plurality of pouch cells than the tab parts, and the cell tabs project beyond the at least one edge portion to an extent that allows for a common production step of the welded connections.

2. The battery pack according to claim 1, wherein at least one of:

the common housing opening is the only housing opening for the cell tabs, and the plurality of pouch cells are configured and disposed in the stack such that the cell tabs are disposed on a common tab side of the stack.

3. The battery pack according to claim 1, the battery pack further comprising:

at least one electric power connector, wherein the at least one electric power connector is electrically connected to one of the tab parts by a welded connection.

4. The battery pack according to claim 1, wherein at least one of:

the battery pack has a maximum electric driving power of a minimum of 1 kW and/or of a maximum of 10 kW, the battery pack has a nominal voltage of a minimum of 10 V and/or of a maximum of 100 V, the battery pack has a maximum energy content of a minimum of 100 Wh and/or of a maximum of 1000 Wh, the battery pack has a mass of a minimum of 0.5 kg and/or of a maximum of 10 kg, and the battery pack has a height of a minimum of 2.5 cm and/or of a maximum of 10 cm, a width of a minimum of 5 cm and/or of a maximum of 20 cm, and a depth of a minimum of 7.5 cm and/or of a maximum of 30 cm.

5. A treatment system, comprising:

a battery pack according to claim 1; and an electrically driven treatment apparatus, wherein the battery pack and the treatment apparatus are configured for electrical connection with each other for supplying the treatment apparatus with electric driving power from the battery pack.

\* \* \* \* \*